US012215907B2

United States Patent
Lumley et al.

(10) Patent No.: US 12,215,907 B2
(45) Date of Patent: Feb. 4, 2025

(54) DUAL LOOP BLENDED COOLING

(71) Applicant: Hanon Systems, Daejeon (KR)

(72) Inventors: Daniel A. Lumley, Livonia, MI (US);
Evangelos S Papoulis, Northville, MI (US); David Diebel, Livonia, MI (US);
Reid Sturos, Howell, MI (US)

(73) Assignee: HANON SYSTEMS, Daejeon (KR)

( * ) Notice: Subject to any disclaimer, the term of this patent is extended or adjusted under 35 U.S.C. 154(b) by 194 days.

(21) Appl. No.: 18/048,318

(22) Filed: Oct. 20, 2022

(65) Prior Publication Data

US 2023/0168008 A1   Jun. 1, 2023

Related U.S. Application Data

(60) Provisional application No. 63/284,374, filed on Nov. 30, 2021.

(51) Int. Cl.
*F25B 5/02* (2006.01)
*F25B 41/20* (2021.01)

(52) U.S. Cl.
CPC ............. *F25B 5/02* (2013.01); *F25B 41/20* (2021.01)

(58) Field of Classification Search
CPC ...... F25B 5/02; F25B 41/20; F25B 2339/047; F25B 25/005; B60H 2001/00307; B60H 1/00278; B60H 2001/00928; B60H 1/00899; B60H 1/32284; B60H 1/00392; B60H 1/00342; B60H 1/143
See application file for complete search history.

(56) References Cited

U.S. PATENT DOCUMENTS

| | | | |
|---|---|---|---|
| 2005/0039878 A1* | 2/2005 | Meyer | F25B 29/003 62/324.1 |
| 2020/0220236 A1* | 7/2020 | Durrani | H01M 10/667 |

FOREIGN PATENT DOCUMENTS

| | | | | |
|---|---|---|---|---|
| KR | 20180093184 A | * | 8/2018 | |
| KR | 20200008516 A | * | 1/2020 | |
| KR | 20200021605 A | * | 3/2020 | |
| KR | 20200038748 A | * | 4/2020 | |
| KR | 20200061460 A | * | 6/2020 | |
| WO | WO-2017086045 A1 | * | 5/2017 | ............... B60H 1/08 |
| WO | WO-2019208942 A1 | * | 10/2019 | ......... B60H 1/00278 |
| WO | WO-2021015483 A1 | * | 1/2021 | ......... B60H 1/00271 |
| WO | WO-2021100409 A1 | * | 5/2021 | ............ F25B 25/005 |

* cited by examiner

*Primary Examiner* — Kun Kai Ma
(74) *Attorney, Agent, or Firm* — James D. Miller; Shumaker, Loop & Kendrick, LLP

(57) ABSTRACT

A thermal management system includes a refrigerant loop including a compressor, a condenser, an expansion element, and a chiller. A first coolant loop of the thermal management system includes the chiller, a first cooling heat exchanger disposed downstream of the chiller, and a distribution valve disposed downstream of the first cooling heat exchanger. A coolant flow path branches from the first coolant loop with the coolant flow path extending from the distribution valve to a re-entry point where the coolant flow path rejoins the first coolant loop at a position downstream of the distribution valve. The coolant flow path includes an electric component, and the distribution valve is configured to control a distribution of the first coolant flowing towards the electric component and the re-entry point.

15 Claims, 2 Drawing Sheets

DUAL LOOP BLENDED COOLING

CROSS-REFERENCE TO RELATED APPLICATION

This patent application claims priority to U.S. Provisional Patent Application Ser. No. 63/284,374, filed on Nov. 30, 2021, the entire disclosure of which is hereby incorporated herein by reference.

FIELD OF THE INVENTION

The invention relates to a thermal management system for an electric vehicle, and more particularly, to a dual loop thermal management system including at least two cooling heat exchangers of a coolant loop placed in heat exchange relationship with a chiller of a refrigerant loop.

BACKGROUND OF THE INVENTION

An electric vehicle may include a dual loop thermal management system associated with controlling a temperature of the air within the passenger cabin of the vehicle as well as controlling a temperature of any electric components associated with the electric vehicle, such as a battery used to power the electric vehicle, among other electric components thereof. Such a dual loop system is provided as a refrigerant loop having a compressor, a condenser, and at least two parallel-arranged chiller flow paths, each of which includes an adjustable expansion valve and a heat exchanger acting as an evaporator of the refrigerant loop, wherein such heat exchangers may be referred to as the chillers of the dual loop system. The condenser of the dual loop system may be responsible for providing the heat necessary to heat the passenger cabin while each of the chillers may be responsible for extracting heat from a coolant used to cool the passenger cabin and/or the electronics of the vehicle.

The chillers may include a cabin chiller configured to selectively cool the passenger cabin of the electric vehicle and an electric component chiller configured to selectively cool the battery or other electric components of the electric vehicle, wherein each of the chillers provides independent temperature control. The cabin chiller is placed in heat exchange relationship with a first coolant loop associated with controlling the temperature of the air within the passenger cabin and the electric component chiller is placed in heat exchange relationship with a second coolant loop associated with controlling the temperature of the battery and/or electric components of the electric vehicle. The parallel flow arrangement of the chillers allows the refrigerant to be distributed between the chiller flow paths for independently controlling the cooling capacity of each of the chillers based on the selected operational mode of the dual loop system and/or the instantaneous characteristics of the dual loop system, such as the temperature of the passenger cabin or the temperature of any of the monitored electric or electronic devices.

One disadvantage of such a dual loop system is the need to provide an independent expansion valve, heat exchanger (chiller), and the necessary fluid routing components to form each of the parallel-arranged chiller flow paths disposed along the refrigerant circuit. The need to repeat such components for each chiller flow path increases the cost of the system, reduces available packaging space within the vehicle, and increases a weight of the system. Furthermore, the additional components can render it difficult to manage the flow of oil within the dual loop system as a result of the increased complexity of the resulting flow configuration.

The use of multiple parallel-arranged chiller flow paths also provides other challenges that must be addressed in controlling the associated dual loop system. The manner in which the flow is distributed between the different chiller flow paths can cause the cooling capacity of the different chiller flow paths to change rapidly and drastically, which can frustrate the ability to control the cooling capacity of each of the corresponding chillers during operation thereof. Such a system may also need to be designed to account for the need to provide a small continuous flow of the refrigerant to the corresponding battery assembly to ensure proper battery stratification. The need to distribute the refrigerant to two different expansion valves also necessitates the use of a control scheme for ensuring that the compressor that is arranged downstream of the chiller flow paths has adequate suction for continuing operation of the refrigerant circuit in the desired manner.

It would therefore be desirable to provide a dual loop thermal management system that eliminates the need to provide an independent chiller flow path with respect to each of the coolant circuits in heat exchange relationship with the dual loop thermal management system.

SUMMARY OF THE INVENTION

Consistent and consonant with the present invention, an improved dual loop thermal management system has surprisingly been discovered.

According to an embodiment of the present invention, a thermal management system includes a first coolant loop including a chiller, a first cooling heat exchanger disposed downstream of the chiller, and a distribution valve disposed downstream of the first cooling heat exchanger. A first coolant flows through the first coolant loop. A coolant flow path branches from the first coolant loop and extends from the distribution valve to a first re-entry point where the coolant flow path rejoins the first coolant loop at a position along the first coolant loop disposed downstream of the distribution valve with respect to the flow of the first coolant through the first coolant loop. The coolant flow path includes an electric component in heat exchange communication with the first coolant. The distribution valve is configured to control a distribution of the first coolant branching from the first coolant loop and flowing towards the electric component along the coolant flow path.

According to another embodiment of the present invention, a thermal management system includes a first coolant loop having a first pump configured to cause a first coolant to flow in order through a chiller, a first cooling heat exchanger disposed downstream of the chiller, and a distribution valve disposed downstream of the first cooling heat exchanger. A coolant flow path branches from the first coolant loop and extends from the distribution valve to a first re-entry point where the coolant flow path rejoins the first coolant loop at a position along the first coolant loop disposed downstream of the distribution valve with respect to the flow of the first coolant through the first coolant loop. The coolant flow path includes a second pump configured to cause the first coolant to flow through the coolant flow path with the coolant flow path including an electric component in heat exchange communication with the first coolant. A coolant recirculation path branches from the coolant flow path with the coolant recirculation path extending from a branch point disposed along the coolant flow path to a second re-entry point disposed along the coolant flow path.

The first coolant flows along the coolant recirculation path in a direction from the branch point towards the second re-entry point. The distribution valve is configured to control a distribution of the first coolant branching from the first coolant loop and flowing towards the electric component along the coolant flow path.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawings.

DETAILED DESCRIPTION OF THE INVENTION

Figure 1:
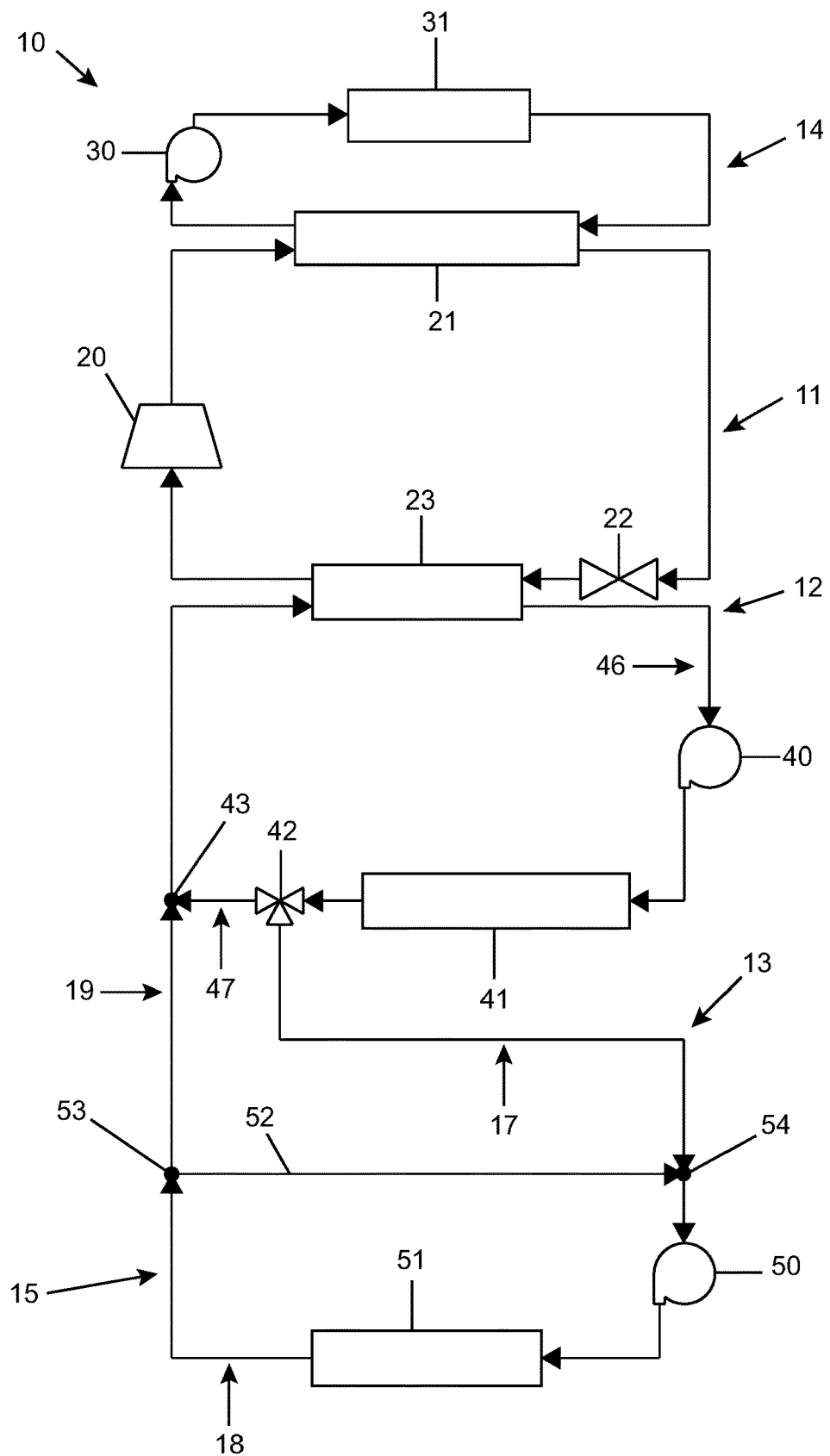
FIG. 1 is a schematic diagram of a thermal management system according to an embodiment of the present invention.

The following detailed description and appended drawings describe and illustrate various embodiments of the invention. The following description of technology is therefore merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a thermal management system 10 according to an embodiment of the present invention. The thermal management system 10 may be incorporated into an electric vehicle or hybrid electric vehicle having a battery assembly for powering the associated vehicle. Such a vehicle may also include a passenger cabin and additional electric or electronic components in need of thermal management, wherein the thermal management system 10 may be configured to control the temperature of each of the battery assembly, the electronic components, and the air within the passenger cabin. However, it should be apparent to one skilled in the art that the components described as being in need of cooling and/or heating may be replaced with alternative components requiring similar thermal management while remaining within the scope of the present invention. For example, the thermal management system 10 may be configured for controlling the temperature of other systems associated with operation of the associated vehicle, or may be associated with a non-vehicular application requiring thermal management of multiple independent systems in the same manner as described herein.

The thermal management system 10 is shown in FIG. 1 as including a refrigerant loop 11, a first coolant loop 12, a coolant flow path 13 branching from the first coolant loop 12, and a second coolant loop 14. Hereinafter, the first coolant loop 12 is alternatively referred to as the cabin cooling loop 12, the coolant flow path 13 is alternatively referred to as the electric cooling flow path 13, and the second coolant loop 14 is alternatively referred to as the radiator loop 14, in accordance with the described operation of each of the components associated with the disclosed embodiment of the thermal management system 10. The refrigerant loop 11 is configured to be in selective heat exchange communication with each of the cabin cooling loop 12 and the radiator loop 14. The cabin cooling loop 12 is in selective fluid communication with the electric cooling flow path 13, thereby establishing selective heat exchange communication between the cabin cooling loop 12 and the electric cooling flow path 13 via the flow of a fluid therebetween. The refrigerant loop 11 may accordingly be said to be in direct heat exchange communication with the cabin cooling loop 12 while the electric cooling flow path 13 may be said to be in indirect heat exchange communication with the refrigerant loop 11 via the flow of the fluid originating from the cabin cooling loop 12.

The refrigerant loop 11 includes a refrigerant circulated therethrough. The refrigerant flows in order through a compressor 20, a condenser 21, an expansion valve 22, and an evaporator 23. The compressor 20 is configured to compress the refrigerant in order to increase the pressure and temperature of the refrigerant for causing the circulation of the refrigerant within the refrigerant loop 11. The condenser 21 is a heat exchanger in fluid and heat exchange communication with each of the refrigerant circulated through the refrigerant loop 11 and a coolant circulated through the radiator loop 14. The condenser 21 is configured to transfer heat from the refrigerant to the coolant of the radiator loop 14, thereby heating the coolant of the radiator loop 14. The coolant of the radiator circuit 14 may be water, hence the condenser 21 may in some circumstances be referred to as a water cooled condenser 21. However, other coolants may be utilized while remaining within the scope of the present invention.

In addition to the condenser 21, the radiator loop 14 further includes a pump 30 and a radiator 31, which may be referred to as a low temperature radiator 31. The pump 30 is configured to circulate the coolant through the radiator loop 14 and the radiator 31 is a heat exchanger configured to transfer heat from the coolant to air to be delivered to the passenger cabin of the associated vehicle. The radiator loop 14 may accordingly be configured to provide heat for heating the air to be delivered to the passenger cabin when a cabin heating mode of operation of the thermal management system 10 is selected by a passenger of the vehicle. The pump 30 may be referred to as the radiator pump 30 to differentiate the pump 30 from the remaining pumps described as forming components of the thermal management system 10 as described hereinafter.

The expansion valve 22 of the refrigerant loop 11 is adjustable to allow the temperature and pressure of the refrigerant through the expansion valve 22 to be controlled, wherein the expansion valve 22 is configured to generally lower the temperature and pressure and refrigerant passing therethrough prior to entry into the evaporator 23.

The evaporator 23 is a heat exchanger configured to transfer heat between a coolant circulated through the cabin cooling loop 12 and the refrigerant of the refrigerant loop 11. As used hereinafter, the evaporator 23 is referred to as the chiller 23 of the refrigerant loop 11 with the chiller 23 configured to transfer heat from the coolant of the cabin cooling loop 12 to the refrigerant of the refrigerant loop 11, thereby aiding in evaporating the refrigerant prior to reintroduction into an inlet end of the compressor 20.

The cabin cooling loop 12 includes, in a direction of flow of the coolant therethrough, a pump 40, a cooler core 41, a distribution valve 42 acting as a branch point, a reentering point 43, and the previously described chiller 23 provided as the evaporator 23 of the refrigerant loop 14. The pump 40 is configured to cause the coolant to circulate through the cabin cooling loop 12. The coolant may be glycol, water, or the like, as desired. The pump 40 may alternatively be referred to herein as the cabin cooling pump 40, for purposes of differentiation from other pumps. The cooler core 41 is a cooling heat exchanger in heat exchange communication with the air to be delivered to the passenger cabin of the associated vehicle, wherein the coolant within the cabin cooling loop 12 receives heat from the air within the cooler core 41 in order to cool the air prior to introduction into the passenger cabin. The coolant is accordingly heated within the cooler core 41 prior to reintroduction into the chiller 23 when flowing around the cabin cooling loop 12 in the described flow direction. The cooler core 41 is disposed downstream of the chiller 23 to cause the coolant entering the cooler core 41 to be relatively cool (lower in temperature) in comparison to the coolant when entering the chiller 23. The cooling capacity of the cooler core 41 is accordingly directly related to the cooling capacity of the chiller 23, which is in turn related to the mode of operation of the refrigerant loop 11 and the resulting characteristics of the refrigerant. Specifically, as more heat is drawn from the coolant circulating through the cabin cooling loop 12 via the chiller 23, the coolant can draw a greater degree of heat from the air encountering the cooler core 41, thereby increasing the ability to cool the air to be delivered to the passenger cabin of the vehicle.

The cabin cooling pump 40 is shown as being disposed downstream of the chiller 23 and upstream of the cooler core 41 along a heat exchange segment 46 of the cabin cooling loop 12 extending from the re-entry point 43 to the distribution valve 42 with respect to the illustrated direction of flow of the coolant through the cabin cooling loop 12. However, the cabin cooling pump 40 may be positioned anywhere relative to the chiller 23 and the cooler core 41 along the heat exchange segment 46 of the cabin cooling loop 12 without necessarily departing from the scope of the present invention.

Figure 2:
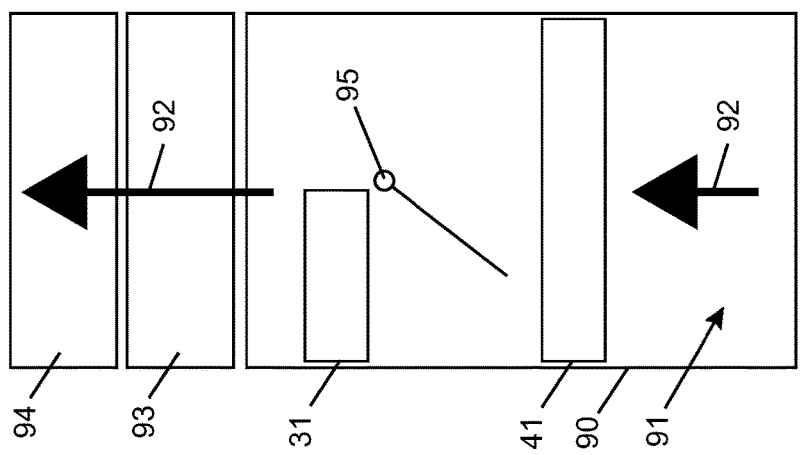
FIG. 2 is a schematic diagram of an HVAC casing that may house one or more heat exchangers of the thermal management system of FIG. 1 for exchanging heat with air delivered to a passenger cabin of a vehicle.

Referring now briefly to FIG. 2, the low temperature radiator 31 and the cooler core 41 are shown as being disposed within a schematically illustrated heating, ventilating, and air-conditioning (HVAC) casing 90 associated with the thermal management system 10. The HVAC casing 90 defines an air flow path 91 through which a flow of air 92 is conditioned prior to delivery to a passenger cabin 94 of the associated vehicle. A delivery system 93 comprising various conduits, ducts, and/or vents may be utilized to deliver the conditioned air from the HVAC casing 90 to the desired portions of the passenger cabin 94. The HVAC casing 90 is shown in simplified form with the cooler core 41 extending across the flow cross-section of the air flow path 91 and the low temperature radiator 31 selectively passable via an operational position of a flow control door 95. However, substantially any configuration of the HVAC casing 90 may be utilized for conditioning the air delivered to the passenger cabin 94 in accordance with the description of each of the heat exchange relationships occurring within each of the low temperature radiator 31 and the cooler core 41. The HVAC casing 90 may also include additional components described as forming any of the loops or flow paths of the thermal management system 10 for further conditioning the air in accordance with the described heat exchange relationships occurring within such components. The HVAC casing 90 may also include additional components not described herein that are associated with other fluid conveying systems or heat exchanging systems of the associated vehicle, as desired, without necessarily departing from the scope of the present invention.

The electric cooling flow path 13 branches from the cabin cooling loop 12, hence the coolant flowing through the electric cooling flow path 13 is the same coolant flowing through the cabin cooling loop 12. More specifically, the electric cooling flow path 13 is a flow path that first branches from the cabin cooling loop 12 at the position of the distribution valve 42 and then re-enters the cabin cooling loop 12 at the position of the re-entry point 43, wherein the coolant flows through the electric cooling flow path 13 in a flow direction from the distribution valve 42 towards the re-entry point 43.

The electric cooling flow path 13 includes, in an order of flow therethrough, a pump 50 and at least one electric component 51 in need of cooling. The pump 50 is configured to cause the coolant to flow through the electric cooling flow path 13 in the prescribed flow direction. The pump 50 may alternatively be referred to herein as the electric component pump 50, for purposes of differentiation from other pumps described herein. The at least one electric component 51 may refer to a battery assembly or heat exchanging structure of the battery assembly of the vehicle, a heat generating electric component or the heat exchanging structure of a heat generating electric component of the vehicle, any other electric or electronic component in need of direct or indirect heating, or any combination thereof, as desired. In any event, the heat generated within each of the corresponding electric components 51 is transferred to the coolant in order to cool each of the electric components 51 disposed along the electric cooling flow path 13. In some embodiments, the at least one electric components 51 may include the coolant cooling each of a battery assembly of the associated vehicle and one or more heat generating electric components powered by the battery assembly of the vehicle, as one non-limiting example.

In some limited circumstances, the coolant may also be utilized to initially heat such electric components 51 for reaching a desired operational temperature, as is necessary. Such heating of the electric components 51 may occur during especially low ambient temperatures and following a period of inactivity of the associated electric components 51, such as when the vehicle is initially started in cold weather conditions. However, it is generally understood that the coolant passing through the electric cooling flow path 13 may be utilized in cooling any heat generating components disposed along the electric cooling flow path 13.

The electric cooling flow path 13 also includes a coolant recirculation path 52 branching therefrom. The coolant recirculation path 52 extends from a branch point 53 disposed downstream of the at least one electric component 51 to a re-entry point 54 disposed upstream of the at least one electric component 51, wherein the electric component pump 50 is disposed between the re-entry point 54 and the branch point 53 along a corresponding heat exchange segment 18 of the electric cooling flow path 13. The electric component pump 50 is shown as being disposed upstream of each of the at least one electric components 51, but the electric component pump 50 may be disposed at any position relative to each of the corresponding electric components 51 along the heat exchange segment 18 without departing from the scope of the present invention. The coolant recirculation path 52 is accordingly configured to recirculate the coolant exiting the at least one electric component 51 back to the electric component pump 50 through the heat exchange segment 18 of the electric cooling flow path 13 disposed between the re-entry point 54 and the branch point 53, thereby allowing at least some of the coolant exiting the at least one electric component 51 to recirculate back therethrough. The coolant recirculation path 52 cooperates with the heat exchange segment 18 of the electric cooling flow path 13 extending from the re-entry point 54 to the branch point 53, which includes the electric component pump 50 and the at least one electric component 51, to form an electric coolant loop 15 of the thermal management system 10.

The electric cooling flow path 13 may accordingly be said to include an entry segment 17 extending from the branch point formed by the distribution valve 42 along the cabin cooling loop 12 to the re-entry point 54 disposed upstream of each of the electric component pump 50 and the at least one electric component 51, a heat exchange segment 18 including the electric component pump 50 and the at least one electric component 51 extending between the re-entry point 54 and the branch point 53, and an exit segment 19 extending from the branch point 53 to the re-entry point 43 disposed along the cabin cooling loop 12. The thermal management system 10 may accordingly include the cabin cooling loop 12 and the electric coolant loop 15 (as formed by the segment 18 and the coolant recirculation path 52) in fluid communication with each other via each of the entry segment 17 and the exit segment 19, wherein the entry segment 17 is configured to always selectively deliver coolant having just flowed through the cabin cooling loop 12 to the electric coolant loop 15 while the exit segment 19 is configured to always selectively deliver coolant having just flowed through the electric coolant loop 15 to the cabin cooling loop 12. As used herein, such selective fluid communication between the two loops 12, 15 may in some circumstances include no flow through the segments 17, 19 when each of the loops 12, 15 are operated independently of each other in the absence of flow therebetween.

The distribution valve 42 may be an adjustable and proportional three-way valve configured to control a distribution of the coolant flowing through the cabin cooling loop 12 that is caused to branch from the cabin cooling loop 12 to flow through the electric cooling flow path 13. The proportional three-way valve may include an inlet receiving the flow of the coolant exiting the cooler core 41 along the cabin cooling loop 12 and a pair of outlets in selective fluid communication with the inlet, wherein a valve element (not shown) determines a distribution of the coolant entering the inlet that is delivered to one or both of the associated outlets. The pair of outlets includes a first outlet associated with delivering a flow of the coolant from the distribution valve 42 to the re-entry point 43 along a coolant return segment 47 of the cabin cooling loop 12 extending from the distribution valve 42 to the re-entry point 43. The coolant return segment 47 is configured to always deliver the distribution of the coolant flowing through the first outlet in a direction towards the re-entry point 43. A second outlet of the distribution valve 42 is associated with delivering a flow of the coolant from the distribution valve 42 to the re-entry point 54 of the electric cooling flow path 13 along the entry segment 17 thereof.

The distribution valve 42 may be adjustable to a plurality of different positions ranging from 0% of the coolant exiting the cooler core 41 entering the electric cooling flow path 13 and 100% of the coolant exiting the cooler core 41 entering the electric cooling flow path 13. Any coolant not entering the electric cooling flow path 13 continues along the cabin cooling loop 12 towards the re-entry point 43 along the coolant return segment 47, where the coolant exiting the distribution valve 42 and flowing through the coolant return segment 47 can mix with any coolant exiting the electric cooling flow path 13 via the exit segment 19 thereof before re-entry of the coolant back into the chiller 23.

In operation, the refrigerant is circulated through the refrigerant loop 11 in order to introduce low temperature and low pressure refrigerant to the chiller 23 acting as the evaporator of the refrigerant loop 11. The chiller 23 allows heat to be transferred from the coolant of the cabin cooling loop 12 to the refrigerant of the refrigerant loop 11, thereby lowering the temperature of the coolant exiting the chiller 23. The lowered temperature coolant then flows through the cooler core 41 where heat is transferred from the air to be delivered to the passenger cabin to the coolant, thereby heating the coolant and lowering the cooling capacity of the coolant exiting the cooler core 41. The air encountering the cooler core 41 is cooled and able to be introduced into the passenger cabin 94 to provide a cooling effect, depending on a selected mode of operation of the thermal management system 10.

In some circumstances, the distribution valve 42 may be adjusted so that all of the coolant exiting the cooler core 41 flows directly to the re-entry point 43 along the coolant return segment 47 such that none of the coolant passes through the electric cooling flow path 13. In other circumstances, at least some of the coolant exiting the cooler core 41 is caused to flow through the electric cooling flow path 13 to receive heat from the at least one electric component 51 (assuming the typical cooling function is being performed). A first portion of the coolant exiting the at least one electric component 51 may flow through the coolant recirculation path 52 via the branch point 53 while a second portion of the coolant exiting the at least one electric component 51 may flow to the re-entry point 43 for flow through the cabin cooling loop 12. In yet other circumstances, all of the coolant exiting the cooler core 41 is caused to flow through the electric cooling flow path 13, as desired.

In some circumstances, the cooler core 41 may not be required for conditioning the air to be delivered to the passenger cabin 94, such as when cooling of the passenger cabin 94 is not desired. During such circumstances, the cooler core 41 may not significantly alter the temperature of the coolant when passing therethrough, hence the amount of heat exchange occurring at the at least one electric component 51 may be more directly linked to the heat exchange occurring within the chiller 23 of the cabin cooling loop 12.

The described thermal management system 10 eliminates the use of parallel flow arranged expansion elements and chillers along the refrigerant loop 11 by utilizing a (partially) series flow arrangement of the same coolant through the cooler core 41 and then the at least one electric component 51 when allowed by the operational position of the distribution valve 42. The elimination of such components reduces a packaging size, cost, and complexity of the resulting thermal management system 10. This configuration is able to meet the thermal management demands of the system 10 due to the lowered cooling capacity required to cool the electric components 51 in comparison to that needed in providing cooling to the passenger cabin of the vehicle, hence the arrangement of the electric components 51 at a position downstream of the cooler core 41 responsible for conditioning the air to be delivered to the passenger cabin 94. The blended cooling provided by the thermal management system 10 also allows for the electric components 51 to always be in fluid communication with at least a small quantity of the coolant without significantly effecting a manner of operation of the cooler core 41. The heat exchanging structures of the thermal management system 10 are also not exposed to undesirably large changes in temperature as a result of a rapid switching of the mode of operation of the thermal management system 10.

The distribution valve 42 also allows the cooling capacity of the coolant when encountering the cooler core 41 or the electric components 51 to be controlled based on the adjustment and distribution of the coolant between the re-entry point 43 and the electric cooling flow path 13. The thermal management system 10 can accordingly be adjusted to account for changing cooling demands of the cabin air, the electric components, or a combination of the two, based on the adjustment of the distribution valve 42.

Figure 3:
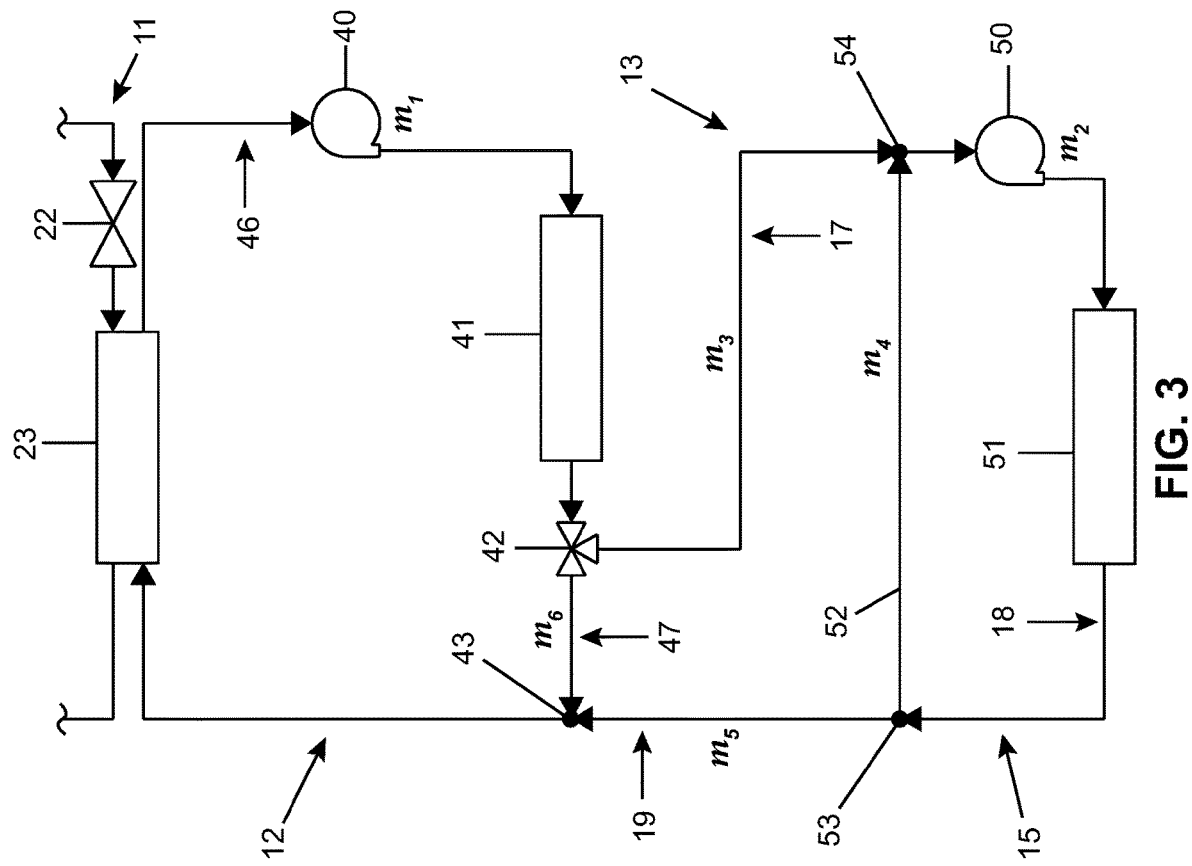
FIG. 3 is a schematic diagram showing a mass flow rate of each partial flow of a coolant flowing through the thermal management system of FIG. 1.

Referring now to FIG. 3, the inclusion of the coolant recirculation path 52 along the electric cooling flow path 13 beneficially allows for the cabin cooling pump 40 and the electric component pump 50 to be operated independently of each other to maintain a desired cooling capacity of the coolant with respect to the cooler core 41 and/or the electric components 51. The coolant recirculation path 52 prevents the formation of a direct series flow arrangement of the pumps 40, 50 with respect to certain positions of the distribution valve 42, which could otherwise cause the flow rate through one of the pumps 40, 50 to directly affect the flow rate through the other of the pumps 40, 50 in an undesirable manner. This ability to independently control the flow rate of the coolant through each of the pumps 40, 50, and hence through each of the heat exchange segments 46, 18 of each of the corresponding loops 12, 15, is best understood via review of the following flow relationships present within the different fluid lines forming the loops 12, 15 and the connecting segments 17, 19.

As shown in FIG. 3, each of the different fluid lines forming a portion of one of the loops 12, 15 or one of the connecting segments 17, 19 is associated with a corresponding mass flow rate that can be related to those mass flow rates of adjacent fluid lines or components. A mass flow rate $m_1$ corresponds to a mass flow rate through the heat exchange segment 46 of the cabin cooling loop 12. The mass flow rate $m_1$ may be determined based on a flow rate of the coolant through the cabin cooling pump 40 as determined by a mode of operation (operational speed) of the cabin cooling pump 40. A mass flow rate $m_2$ corresponds to a mass flow rate through the heat exchange segment 18 of the electric cooling flow path 13. The mass flow rate $m_2$ may be determined based on a flow rate of the coolant through the electric component pump 50 as determined by a mode of operation (operational speed) of the electric component pump 50.

A mass flow rate $m_3$ corresponds to a mass flow rate through the entry segment 17 of the electric cooling flow path 13. The mass flow rate $m_3$ is determined by an operational position of the distribution valve 42 as follows, where $V_o$ is representative of a percentage of the coolant exiting the cooler core 41 along the cabin cooling loop 12 that is distributed by the distribution valve 42 to the electric cooling flow path 13 via the entry segment 17:

$$m_3 = V_o m_1$$

Regarding the remaining flow segments, a mass flow rate $m_4$ corresponds to a mass flow rate through the coolant recirculation path 52, a mass flow rate $m_5$ corresponds to a mass flow rate through the exit segment 19 of the electric cooling flow path 13, and a mass flow rate $m_6$ corresponds to a mass flow rate through the coolant return segment 47 of the cabin cooling loop 12. An analysis of the flow relationships present between these described mass flow rates $m_1$, $m_2$, $m_3$, $m_4$, $m_5$, $m_6$, as determined by the illustrated and described branches and re-entries of the coolant at each specified position along each loop 12, 15, leads to discovery of the following relationships:

$$m_1 = \frac{1}{V_o} m_2 - \frac{1}{V_o} m_4$$

$$m_2 = V_o m_1 + m_4$$

$$m_4 = m_2 - V_o m_1$$

$$m_3 = m_5$$

These relationships illustrate the manner in which the presence of the coolant recirculation path 52 at the specified position leads to the ability to independently control the flow rate of the coolant through each of the specified heat exchange segments 46, 18 of each of the loops 12, 15. The manner in which the mass flow rate $m_3$ equals the mass flow rate $m_5$ indicates that an increase or decrease in the percentage of the coolant distributed to the electric cooling flow path 13 at the distribution valve 42 does not impact the mass flow rate $m_1$ along the heat exchange segment 46 of the cabin cooling loop 12 as a corresponding flow of the coolant along the exit segment 17 contemporaneously enters the cabin cooling loop 12 in accordance with any such increase or decrease of the coolant along the electric cooling flow path 13. This is possible because the coolant recirculation path 52 conveys a quantity of the coolant therethrough that is dependent on each of the mass flow rates $m_1$, $m_2$, as determined by operation of the pumps 40, 50, as well as the operational position of the distribution valve 42. The above relationships illustrate that a change in any one of the mass flow rate $m_1$ as caused by a change in operation of the pump 40, the mass flow rate $m_2$ as caused by a change in operation of the pump 50, or the percentage of the coolant flowing from the loop 12 to the loop 15 based on the operational position of the distribution valve 42 can be accommodated by a change in the value of the mass flow rate $m_4$ such that the values of the mass flow rates $m_1$, $m_2$ may remain constant and unchanged in reaction to a change in any remaining variables.

The configuration of the loops 12, 15 also provides a benefit over a purely series flow arrangement of the cooler core 41 and the at least one electric component 51 wherein the same mass flow rate of the coolant passes in succession therethrough. Instead, the present invention allows the mass flow rate $m_1$ and the mass flow rate $m_2$ to be varied from one another along those segments 46, 18 having heat exchanging structures disposed therealong. The corresponding mass flow rate $m_1$, $m_2$ of the coolant when passing over one of the heat exchanging structures has an effect on the heat exchange capacity of the corresponding heat exchanging structure, hence the ability to vary $m_1$ from $m_2$ provides an ability to further control and differentiate the degree of heat exchange taking place within each of the respective heat exchange segments 46, 18. The thermal management system 10 can accordingly account for varying heating and/or cooling requirements with respect to the passenger cabin 94 and/or the electric components 51 by independently controlling the flow rate of the common coolant among the two pumps 40, 50.

The thermal management system 10 as disclosed herein may be provided with additional components and/or fluid flow paths to those shown and described herein while remaining within the scope of the present invention, so long as the described benefits are still maintained with respect to the manner in which the same coolant can be utilized for performing heat exchange with respect to the two different loops 12, 15 while controlling the flow rate through each of the loops 12, 15 independently. For example, additional fluid systems may be in heat exchange relationship with one of the loops 12, 15, or one of the loops 12, 15 may include additional flow paths, such as bypass paths around certain heat exchanging structures, so long as the described interactions between the different loops 12, 15 are maintained.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A thermal management system comprising:
a first coolant loop including a chiller, a first cooling heat exchanger disposed downstream of the chiller, and a distribution valve disposed downstream of the first cooling heat exchanger, wherein a first coolant flows through the first coolant loop;

a coolant flow path branching from the first coolant loop, the coolant flow path extending from the distribution valve to a first re-entry point where the coolant flow path rejoins the first coolant loop at a position along the first coolant loop disposed downstream of the distribution valve with respect to the flow of the first coolant through the first coolant loop, the coolant flow path including an electric component in heat exchange communication with the first coolant, wherein the distribution valve is configured to control a distribution of the first coolant branching from the first coolant loop and flowing towards the electric component along the coolant flow path; and a refrigerant loop including a compressor, a condenser, an expansion element, and the chiller of the first coolant loop acting as an evaporator of the refrigerant loop, wherein a refrigerant flows through the refrigerant loop, wherein the chiller provides heat exchange communication between the refrigerant of the refrigerant loop and the first coolant of the first coolant loop, wherein heat is transferred from the first coolant to the refrigerant through the chiller to lower a temperature of the first coolant prior to entry into the first cooling heat exchanger, and wherein the first cooling heat exchanger is configured to transfer heat from air to be delivered to a passenger cabin of a vehicle to the first coolant.

2. The thermal management system of claim 1, wherein the condenser of the refrigerant loop is in heat exchange communication with a second coolant loop having a radiator, and wherein the radiator of the second coolant loop and the first cooling heat exchanger of the first coolant loop are each disposed within an HVAC casing configured to deliver the air to the passenger cabin of the vehicle.

3. The thermal management system of claim 1, wherein a coolant recirculation path branching from the coolant flow path extends from a branch point disposed along the coolant flow path to a second re-entry point disposed along the coolant flow path, wherein the first coolant flows along the coolant recirculation path in a direction from the branch point towards the second re-entry point.

4. The thermal management system of claim 3, wherein the branch point is disposed downstream of the electric component with respect to the flow of the first coolant along the coolant flow path, and wherein the second re-entry point is disposed upstream of the electric component with respect to the flow of the first coolant along the coolant flow path.

5. The thermal management system of claim 4, wherein a first pump is disposed along the first coolant loop and a second pump is disposed along the coolant flow path.

6. The thermal management system of claim 5, wherein the first pump is disposed downstream of the first re-entry point and upstream of the distribution valve along the first coolant loop, and wherein the second pump is disposed downstream of the second re-entry point and upstream of the branch point along the coolant flow path.

7. The thermal management system of claim 5, wherein a mass flow rate of the first coolant through the first pump and a mass flow rate of the first coolant through the second pump are controlled independently of each other.

8. The thermal management system of claim 4, wherein a first segment of the coolant flow path extending from the second re-entry point to the branch point cooperates with the coolant recirculation path to form an electric component coolant loop in fluid communication with the first coolant loop.

9. The thermal management system of claim 1, wherein the electric component includes at least one of a battery and/or a heat generating electronic component.

10. A thermal management system comprising:
a first coolant loop including a chiller, a first cooling heat exchanger disposed downstream of the chiller, and a distribution valve disposed downstream of the first cooling heat exchanger, wherein a first coolant flows through the first coolant loop; and
a coolant flow path branching from the first coolant loop, the coolant flow path extending from the distribution valve to a first re-entry point where the coolant flow path rejoins the first coolant loop at a position along the first coolant loop disposed downstream of the distribution valve with respect to the flow of the first coolant through the first coolant loop, the coolant flow path including an electric component in heat exchange communication with the first coolant, wherein the distribution valve is configured to control a distribution of the first coolant branching from the first coolant loop and flowing towards the electric component along the coolant flow path, wherein a coolant recirculation path branching from the coolant flow path extends from a branch point disposed along the coolant flow path to a second re-entry point disposed along the coolant flow path, wherein the first coolant flows along the coolant recirculation path in a direction from the branch point towards the second re-entry point, wherein the branch point is disposed downstream of the electric component with respect to the flow of the first coolant along the coolant flow path, and wherein the second re-entry point is disposed upstream of the electric component with respect to the flow of the first coolant along the coolant flow path, wherein a first segment of the coolant flow path extending from the second re-entry point to the branch point cooperates with the coolant recirculation path to form an electric component coolant loop in fluid communication with the first coolant loop, wherein a second segment of the coolant flow path extending from the distribution valve to the second re-entry point transfers the first coolant from the first coolant loop to the electric component coolant loop and a third segment of the coolant flow path extending from the branch point to the first re-entry point transfers the first coolant from the electric component coolant loop to the first coolant loop.

11. The thermal management system of claim 10, wherein a mass flow rate of the first coolant along the second segment of the coolant flow path is equal to a mass flow rate of the first coolant along the third segment of the coolant flow path.

12. The thermal management system of claim 11, wherein the mass flow rate of the first coolant along the second segment of the coolant flow path remains equal to the mass flow rate of the first coolant along the third segment of the coolant flow path regardless of the distribution of the first coolant delivered to the coolant flow path at the distribution valve.

13. A thermal management system comprising:
a first coolant loop including a first pump configured to cause a first coolant to flow in order through a chiller, a first cooling heat exchanger disposed downstream of the chiller, and a distribution valve disposed downstream of the first cooling heat exchanger;
a coolant flow path branching from the first coolant loop, the coolant flow path extending from the distribution valve to a first re-entry point where the coolant flow path rejoins the first coolant loop at a position along the first coolant loop disposed downstream of the distribution valve with respect to the flow of the first coolant through the first coolant loop, the coolant flow path including a second pump configured to cause the first coolant to flow through the coolant flow path, the coolant flow path including an electric component in heat exchange communication with the first coolant;

a coolant recirculation path branching from the coolant flow path, the coolant recirculation path extending from a branch point disposed along the coolant flow path to a second re-entry point disposed along the coolant flow path, wherein the first coolant flows along the coolant recirculation path in a direction from the branch point towards the second re-entry point, wherein the distribution valve is configured to control a distribution of the first coolant branching from the first coolant loop and flowing towards the electric component along the coolant flow path; and a refrigerant loop including a compressor, a condenser, an expansion element, and the chiller of the first coolant loop acting as an evaporator of the refrigerant loop, wherein a refrigerant flows through the refrigerant loop, wherein the chiller provides heat exchange communication between the refrigerant of the refrigerant loop and the first coolant of the first coolant loop, wherein heat is transferred from the first coolant to the refrigerant through the chiller to lower a temperature of the first coolant prior to entry into the first cooling heat exchanger, and wherein the first cooling heat exchanger is configured to transfer heat from air to be delivered to a passenger cabin of a vehicle to the first coolant.

14. The thermal management system of claim 13, wherein the branch point is disposed downstream of the electric component and the second pump with respect to the flow of the first coolant along the coolant flow path, and wherein the second re-entry point is disposed upstream of the electric component and the second pump with respect to the flow of the first coolant along the coolant flow path, and wherein the first pump is disposed downstream of the first re-entry point and upstream of the distribution valve with respect to the flow of the first coolant along the first coolant loop.

15. The thermal management system of claim 13, wherein the condenser of the refrigerant loop is in heat exchange communication with a second coolant loop having a radiator, and wherein the radiator of the second coolant loop and the first cooling heat exchanger of the first coolant loop are each disposed within an HVAC casing configured to deliver the air to the passenger cabin of the vehicle.

\* \* \* \* \*